United States Patent
Reese et al.

(10) Patent No.: US 11,588,201 B2
(45) Date of Patent: *Feb. 21, 2023

(54) PORTABLE POWER TOOL, BATTERY PACK, AND CELL CONFIGURATIONS FOR SAME

(71) Applicant: Transform SR Brands LLC, Hoffman Estates, IL (US)

(72) Inventors: Brian Todd Reese, St. Charles, IL (US); Cody Lyle Mayer, Chicago, IL (US); David S. Pozgay, Wilmette, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,897

(22) Filed: Jun. 7, 2021

(65) Prior Publication Data

US 2021/0367302 A1 Nov. 25, 2021

Related U.S. Application Data

(63) Continuation of application No. 16/777,487, filed on Jan. 30, 2020, now Pat. No. 11,031,653, which is a continuation of application No. 15/471,514, filed on Mar. 28, 2017, now Pat. No. 10,553,843.

(60) Provisional application No. 62/314,039, filed on Mar. 28, 2016.

(51) Int. Cl.
*H01M 50/213* (2021.01)
*B25F 5/02* (2006.01)
*H01M 10/052* (2010.01)

(52) U.S. Cl.
CPC ............. *H01M 50/213* (2021.01); *B25F 5/02* (2013.01); *H01M 10/052* (2013.01); *H01M 2220/30* (2013.01)

(58) Field of Classification Search
CPC ..... B25F 5/02; H01M 50/213; H01M 10/052; H01M 2220/30
See application file for complete search history.

(56) References Cited

U.S. PATENT DOCUMENTS

| 4,352,052 A | 9/1982 | Opper |
| 4,963,812 A | 10/1990 | Mischenko et al. |
| 5,076,805 A | 12/1991 | Welch |
| 5,316,873 A | 5/1994 | Scrivano |
| 5,656,914 A | 8/1997 | Nagele et al. |

(Continued)

FOREIGN PATENT DOCUMENTS

| DE | 202013103025 | 9/2013 |
| EP | 833137 | 9/2007 |

(Continued)

OTHER PUBLICATIONS

English translation of JP Publication 2002-260619, Sep. 2002.*

(Continued)

*Primary Examiner* — Brittany L Raymond
(74) *Attorney, Agent, or Firm* — McAndrews Held & Malloy, Ltd.

(57) ABSTRACT

Various battery packs are presented for use with twenty volt (20 V) power tools. In some embodiments, one or more lithium-ion battery cells of the battery packs are received by a handle of the power tool.

20 Claims, 13 Drawing Sheets

(56) References Cited

U.S. PATENT DOCUMENTS

| | | |
|---|---|---|
| 6,057,608 A | 5/2000 | Bailey et al. |
| 6,525,511 B2 | 2/2003 | Kubale et al. |
| 6,617,824 B1 | 9/2003 | Zedell et al. |
| 6,621,246 B2 | 9/2003 | Kubale et al. |
| 6,876,173 B2 | 4/2005 | Mastaler et al. |
| 6,902,293 B2 | 6/2005 | Tang |
| 6,965,214 B2 | 11/2005 | Kubale et al. |
| 7,018,233 B1 | 3/2006 | Griffin, III et al. |
| 7,183,745 B2 | 2/2007 | Kubale et al. |
| 7,339,350 B2 | 3/2008 | Kubale et al. |
| 7,435,508 B2 | 10/2008 | Lee et al. |
| 7,443,137 B2 | 10/2008 | Scott et al. |
| 7,468,596 B2 | 12/2008 | Shum |
| 7,514,172 B2 | 4/2009 | Furth et al. |
| 7,554,290 B2 | 6/2009 | Johnson et al. |
| 7,629,766 B2 | 12/2009 | Sadow |
| 7,695,853 B2 | 4/2010 | Wells et al. |
| 7,884,573 B1 | 2/2011 | Larsen |
| 7,897,276 B2 | 3/2011 | Campesi |
| 7,950,955 B2 | 5/2011 | Larsen |
| 8,025,994 B2 | 9/2011 | Nishimaki et al. |
| 8,115,452 B2 | 2/2012 | Liang |
| 8,120,318 B2 | 2/2012 | Nakasho et al. |
| 8,269,459 B2 | 9/2012 | Johnson |
| 2004/0257038 A1 | 12/2004 | Johnson |
| 2005/0077873 A1 | 4/2005 | Watson et al. |
| 2006/0268504 A1 | 11/2006 | Shimizu |
| 2007/0090796 A1 | 4/2007 | Norris |
| 2007/0273211 A1 | 11/2007 | Wang |
| 2008/0012526 A1 | 1/2008 | Sadow |
| 2010/0092850 A1 | 4/2010 | Ueda |
| 2011/0012560 A1 | 1/2011 | Sakakibara |
| 2013/0113438 A1 | 5/2013 | Aradachi |
| 2013/0193891 A1 | 8/2013 | Wood |
| 2015/0188270 A1 | 7/2015 | Knight |
| 2015/0303417 A1 | 10/2015 | Koeder |
| 2015/0333559 A1 | 11/2015 | Lohr |

FOREIGN PATENT DOCUMENTS

| | | | |
|---|---|---|---|
| GB | 2386746 | | 9/2003 |
| JP | 2002-260619 | * | 9/2002 |
| KR | 2014-0132132 | * | 11/2014 |
| WO | 2005038954 | | 4/2005 |

OTHER PUBLICATIONS

English translation of KR Publication 2014-0132132, Nov. 2014.*
"Check Out Dewait 18V 1.3AH Replacement Power Tool Battery for DW9095, DW9096", 1 page, dated Aug. 6, 2012.
"Great Price Battery Adapter MML18 for $34.99", 1 page, dated Aug. 6, 2012.
Extended European Search Report for 14198219.9, dated Jul. 31, 2015. (6 pages).

* cited by examiner

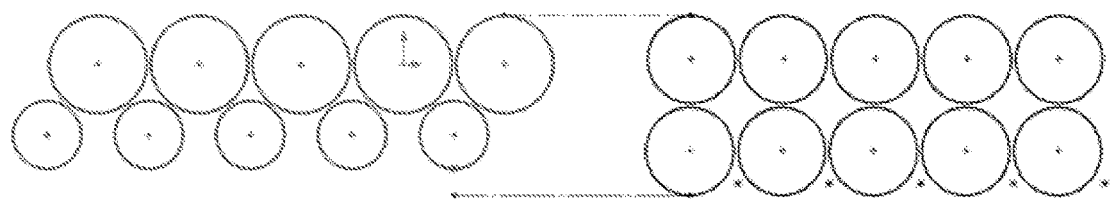
FIG. 13A
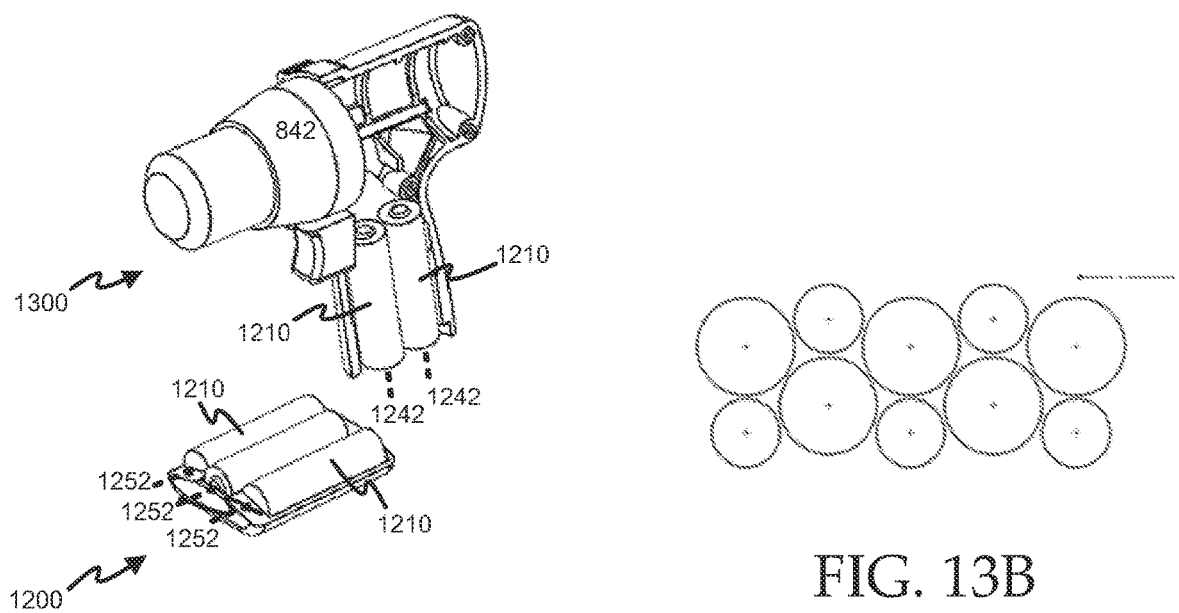
FIG. 11E
FIG. 13B

PORTABLE POWER TOOL, BATTERY PACK, AND CELL CONFIGURATIONS FOR SAME

FIELD OF THE INVENTION

Various embodiments relate to power tools and battery packs, and more particularly, to twenty volt, lithium ion battery packs and the portable power tools that use them.

BACKGROUND OF THE INVENTION

Lithium ion battery packs for power tools include several cylindrical, lithium ion battery cells. Each cylindrical cell typically produces 3.6-4.0 volts. More specifically, such cells typically provide 3.6 volts during use and 4.0 volts when fully charged. Marketing departments may label battery packs using such lithium ion cells with voltages between 3.6-4.0 volts or multiples thereof depending on the number of cells in series. Lithium ion battery packs for portable power tools typically include either three lithium ion cells or five lithium ion cells (or multiples thereof in parallel). The three cell packs generally provide 10.8-12.0 volts and are commonly referred to as 12 volt packs. The five cell packs generally provide 18-20 volts are commonly referred to as 20 volt packs. Power tools using the 12 volt packs have the advantage of being lighter and more compact. Conversely, power tools using the 20 volt packs are more powerful.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Power tools and various lithium ion battery packs for such power tools are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 11A-11E show a power tool system that includes a power tool and a battery pack in accordance with an embodiment of the present invention.

FIGS. 13A and 13B show battery cell arrangements in accordance with an embodiment of the present invention.

DETAILED DESCRIPTION OF THE INVENTION

Aspects of the present invention are related to power tools and battery packs used by such tools. More specifically, certain embodiments of the present invention relate to power tools that may use battery packs having a variety of different forms, cell configurations, and power capabilities. Thus, a power tool vendor may provide a variety of different battery packs in order to permit greater flexibility in matching power, size, weight, etc. of the battery pack to the job at hand. For some jobs, a customer may desire or need greater power. For other jobs, the customer may be willing to sacrifice some power or battery life in order to have a smaller, lighter, better balanced, and/or maneuverable power tool.

The figures of the present application generally depict a power tool in the form of a drill driver. Such depiction of a drill driver is for illustrative purposes. The various disclosed battery packs and cell configurations may be utilized with other types of power tools such as, for example impact wrenches, circular saw, miter saws, impact drivers, etc. to name a few.

Figure 1A:
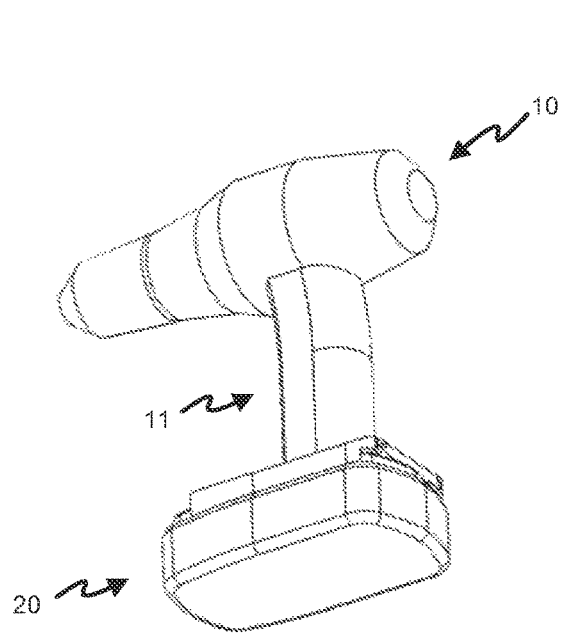
FIGS. 1A-1C show a power tool system that includes a power tool, a battery pack, and battery charger in accordance with an embodiment of the present invention.
Figure 1B:
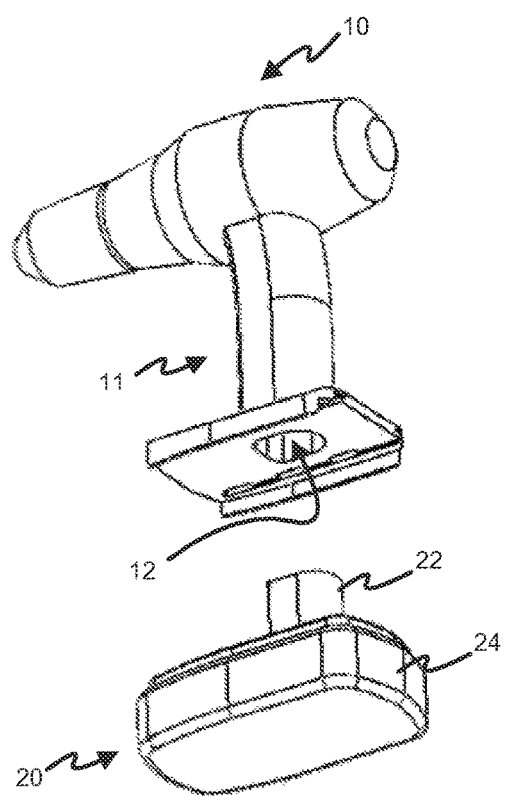
Figure 1C:
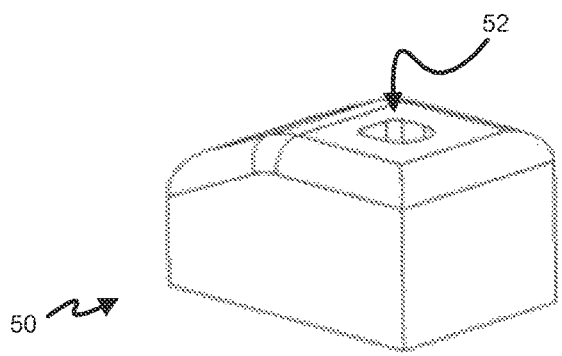

FIGS. 1A and 1B shows a power tool system comprising a power tool 10 and a battery pack 20. In particular, FIG. 1A depicts the battery pack 20 attached to the power tool 10 and FIG. 1B depicts the battery pack 20 detached from the power tool 10. FIG. 1C further shows a charger 50 of the power tool system, which may be used to recharge battery cells of the battery pack 20.

As shown in FIGS. 1A and 1B, the power tool 10 may include a handle 11 providing a battery compartment configured to receive the battery pack 20. More specifically, the handle 11 may include a cavity 12 configured to receive a post portion 22 of the battery pack 20. The post portion 22 may be inserted into a proximal end of the cavity 12. The post portion 22 may slide longitudinally into the cavity 12 of the handle 11 and toward a distal end of the cavity 12 until properly seated and attached to power tool 10.

The post portion 22 may include electrical contacts (not shown) that are configured to electrically couple to electrical contacts of the power tool 10 when the post portion 22 is inserted and seated in the cavity 12. In particular, electrical contacts of the power tool 10 and battery pack 20 may electrically couple rechargeable, battery cells of the battery pack 20 to components (e.g., motor, controller, etc.) of the power tool 10 so as to provide such components with electrical power when the battery pack 20 is attached to the power tool 10.

The battery pack 20 may further include locking or latching devices which are configured to mechanically, and selectively couple or latch the battery pack 20 to the power tool 10. In particular, left and right sides of the base portion 24 may each include spring-loaded detents and corresponding release buttons. The detents may engage corresponding recesses or catches of the power tool 10 and secure the battery pack 20 to the power tool 10. When pressed, the release buttons may actuate correspond detents and cause such detents to disengage the recesses, thus permitting the battery pack 20 to be disengaged and removed from the power tool 10.

FIG. 1C depicts a battery charger 50 with a cavity 52 configured to receive the post portion 22 of the battery pack 20. The battery charger 50 is configured to charge the one or more rechargeable, battery cells of the battery pack 20 when the post portion 22 is inserted in cavity 52 and the post battery 20 is properly seated in the battery charger 50. The battery charger 50 may include electrical contacts (not shown) that engage the electrical contacts of the battery pack 20 when the post portion 22 is properly inserted and seated in the cavity 52. In this manner, the battery charger 50 may supply the one or more rechargeable, battery cells with electrical power used to recharge such cells.

As shown in FIG. 1A, the battery pack 20 may include an outer housing or casing that comprises the post portion 22 and a base or boot portion 24. The post portion 22 and base portion 24 generally house a plurality of cylindrical, lithium ion battery cells that supply power to the power tool 10 during use. As explained in more detail below, the post portion 22 in various embodiments may include one or more battery cells. Due to housing one or more battery cells in the post portion 22, all or at least a portion of such cells are positioned within the handle 11 of the power tool 10 when the battery pack 20 is attached to the power tool 10. Such a configuration reduces the size of the base portion 24 in comparison to a configuration in which all battery cells of the battery pack are housed within the base portion 24. Moreover, by positioning one or more battery cells in the post portion 22, the overall size or footprint of the power tool 10 with attached battery pack 20 is also reduced since the portion of the battery pack 20 extending from the power tool 10 (e.g., the base portion 24) is smaller. Accordingly, such a power tool 10 with attached battery pack 20 may be easier to maneuver and use than a power tool in which the battery cells are housed solely in a base portion of the attached battery pack.

Referring now to FIGS. 2A-2D, 3A-3D, and 4A-4D, an example power tool 100 is shown in relation to three different twenty volt (20 V) battery packs 200, 300, 400. More specifically, the 20 V battery pack 200 of FIGS. 2A-2D includes five cylindrical, lithium ion batteries 210 having a diameter of fourteen millimeters (14 mm). The 20 V battery pack 300 of FIGS. 3A-3D includes five cylindrical, lithium ion batteries 310 having a diameter of eighteen millimeters (18 mm). The 20 V battery pack 400 of FIGS. 4A-4D includes five cylindrical, lithium ion batteries 310 having a diameter of twenty millimeters (20 mm) to twenty-one millimeters (21 mm), hereinafter referred to as 20 mm cells.

In comparison to the 18 mm cells 310 and 20 mm cells 410, the 14 mm cells 210 are compact and light. As such, battery pack 200 is smaller and lighter than the 18 mm cell, battery pack 300 and the 20 mm cell, battery pack 400. The 14 mm cells 210, however, are not as powerful as the 18 mm cells 310 or the 20 mm cells. As such, the 14 mm battery pack 200 is generally suitable for jobs where lighter weight, greater maneuverability, and/or smaller size are preferred over greater power and/or longer battery life.

The 20 mm cells 410 are larger and heavier than the 14 mm cells 210 and the 18 mm cells 310. However, as a result of the larger size and greater weight, the 20 mm cells 410 also provide more power than the 14 mm cells 210 and the 18 mm cells 310. As such, the 20 mm cell, battery pack 400 is generally better suited for jobs where greater power and/or longer battery life is more important than size or weight.

The 18 mm cells 310 generally have a lower price point than either the 14 mm cells 210 and the 20 mm cells 410 due to 18 mm cells 310 being extremely prevalent resulting in a much higher manufacturing volume than the 14 mm cells 210 or the 20 mm cells 410. The 18 mm cells 310 generally provide a performance level between the 14 mm cells 210 and the 20 mm cells 410.

The power tool system of FIGS. 2A-2D, 3A-3D, and 4A-4D includes a power tool 100 configured to receive and use any of the battery packs 200, 300, 400. In one embodiment, the battery packs 200, 300, 400 each provide a similarly sized and shaped post portion 220, 320, 420 for insertion into the handle 110 of the power tool 100. However, in other embodiments, each of the battery packs 200, 300, 400 may have a different shape and/or size and a battery compartment of the power tool 100 may be configured to adapt to and/or operably receive each of the different shaped/sized post portions 220, 320, 420. Regardless, the power tool 100, due to its compatibility with each of the battery packs 200, 300, 400, may enjoy the unique, benefits provided by each cell size. For example, the power tool 100 may use the smaller, lighter weight battery pack 200 for light duty jobs, use the larger, heavier, and generally more expensive battery pack 400 for heavy duty jobs, and may use the cheaper, all-purpose battery pack 300 when neither light weight nor more power are paramount.

Referring now to FIGS. 2A-2D, further details of the battery pack 200 with respect to power tool 100 will be explained. As shown, the battery pack 200 includes an outer housing 202 or casing having a post portion 220 and a base portion 230. Similar to the power tool 10 of FIGS. 1A and 1B, the power tool 100 may include a handle 110 providing a battery compartment configured to receive the battery pack 200. More specifically, the handle 110 may include a cavity configured to receive the post portion 220 of the battery pack 200. The post portion 220 may be inserted and slid into a proximal end of the cavity toward a distal end of the cavity until the battery pack 200 is properly seated and attached to power tool 100.

The post portion 220 may include electrical contacts (not shown) that are configured to electrically couple to electrical contacts of the power tool 100 when the post portion 220 is inserted and seated in the handle 110 of the power tool 100. In particular, electrical contacts of the power tool 100 and battery pack 200 may electrically couple rechargeable, battery cells 210 of the battery pack 200 to the power tool 100 so as to provide electrical power to electrical components of the power tool 100.

Figure 2A:
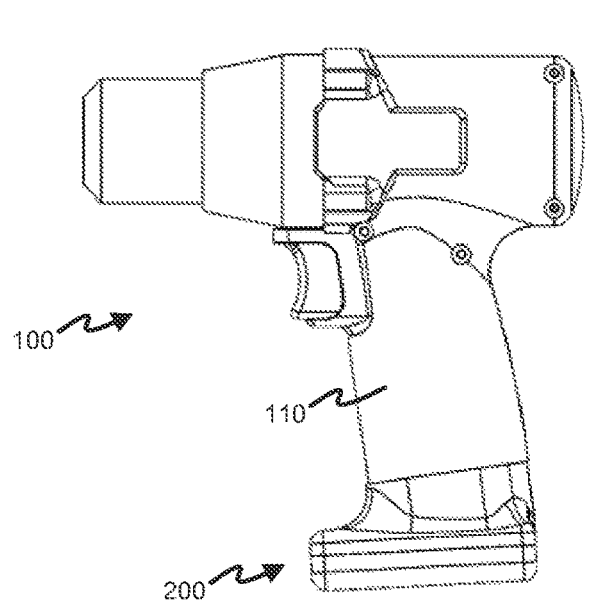
FIGS. 2A-2D show a power tool system that includes a power tool and a battery pack in accordance with an embodiment of the present invention.
Figure 2B:
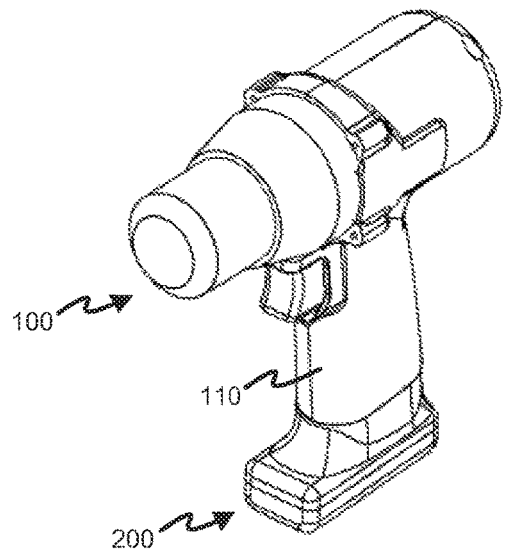
Figure 2C:
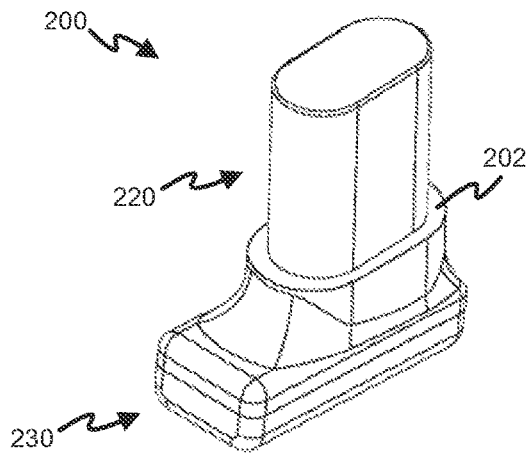
Figure 2D:
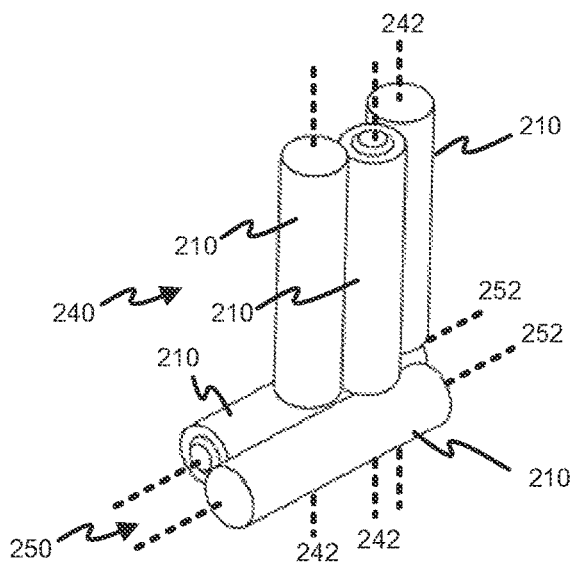

As shown in FIGS. 2C and 2D, the battery pack 200 includes five battery cells 210 in the housing 202. In particular, each battery cell 210 may nominally provide 4 volts and may be coupled in series with one another to realize a battery pack 200 that provides a nominal voltage of 20 volts. The battery cells 210 may be any rechargeable battery cell chemistry type, such as, for example, nickel cadmium (NiCd), nickel-metal hydride (NiMH), Lithium (Li), Lithium-ion (Li-ion), other Lithium-based chemistry, other rechargeable battery cell chemistry, etc. However, in one preferred embodiment, each of the battery cells 210 is a lithium-ion battery cell.

As shown, each battery cell 210 may have generally cylindrical shape and may extend along a cell axis 242, 252 that is parallel to an outer, cylindrical cell wall of each cell 210. Moreover, each battery cell 210 may have a diameter of about fourteen millimeters (14 mm) and a length in the range of about sixty millimeters (60 mm) to about seventy millimeters (70 mm), with nominal lengths of 60 mm, 65 mm, and 70 mm preferred in some embodiments.

As shown, the battery cells 210 are arranged in a first group 240 of three battery cells and a second group 250 of two battery cells. In the first group 240, the cell axes 242 are parallel to one another. In the second group 250, the cell axes 252 are parallel to each other. However, the first group 240 and the second group 250 are arranged so that the cell axes 242 of the first group 240 are not parallel to the cell axes 252 of the second group 250. As shown in FIG. 2D, the cell axes 242 of the first group 240 may be perpendicular or nearly perpendicular (e.g., 90°±5°) to the cell axes 252 of the second group 252. However, in other embodiment, the cell axes 242 of the first group 240 may form a more acute angle (e.g., between about 90° and about 70°, or between about 90° and about 45°) with the cell axes 252 of the second group 250.

Moreover, the first group 240 of cells 210 are positioned to correspond to the post portion 220 of the battery pack housing 202 and the second group 250 of cells 210 are positioned to correspond to the base portion 230 of the battery pack housing 202. As a result of such configuration, the first group 240 of cells 210 are generally received by the handle 110 of the power tool 100 when the battery pack 200 is attached to the power tool 100. Conversely, the second group 250 of cells 210 are generally not received by the handle 110 of the power tool 100 when the battery pack 200 is attached to the power tool.

In some embodiments, the first group 240 of cells 210 are completely received by the power tool 100 or handle 110 such that 100% of the volume of each cell 210 in the first group 240 is contained within the power tool 100 or handle 110. In other embodiments, the first group 240 is substantially received by the handle 110 such that greater than 80% of the volume of each cell 210 is contained within the power tool 100 or handle 110 and less the 20% of the volume of each cell 210 extends beyond the power tool 100 or handle 110. In yet other embodiments, the first group 240 is mostly received by the power tool 100 or handle 110 such that greater than 50% of the volume of each cell 210 is contained within the power tool 100 or handle 110 and less the 50% of the volume of each cell 210 extends beyond the power tool 100 or handle 110.

By arranging the battery cells 210 in the battery pack 200 such that one or more cells 210 extend into the power tool 100 or handle 110 when attached, the battery pack 200 reduces the overall size or footprint of the power tool 100 when in use. More specifically, a battery pack such as battery pack 200 reduces the usable footprint of the power tool 100 when compared to a battery pack in which none of the cells are contained, substantially contained, or mostly contained by the power tool 100 or handle 110 when the battery pack is attached to the power tool 100.

Referring now to FIGS. 3A-3D, further details of the battery pack 300 with respect to power tool 100 will be explained. As shown, the battery pack 300 includes an outer housing 302 or casing having a post portion 320 and a base portion 330. Similar to the post portion 220 of battery pack 200, the post portion 320 may be inserted and slid into a proximal end of a power tool cavity toward a distal end of the cavity until the battery pack 300 is properly seated and attached to power tool 100.

The post portion 320 may include electrical contacts (not shown) that are configured to electrically couple to electrical contacts of the power tool 100 when the post portion 320 is inserted and seated in the handle 110 of the power tool 100. In particular, electrical contacts of the power tool 100 and battery pack 300 may electrically couple rechargeable, battery cells 310 of the battery pack 300 to the power tool 100 so as to provide electrical power to electrical components of the power tool 100.

Figure 3A:
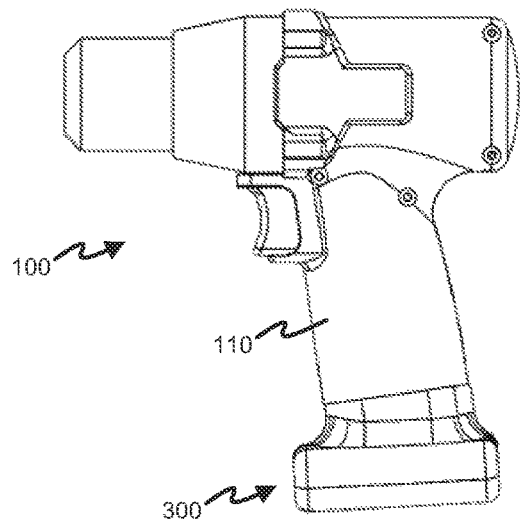
FIGS. 3A-3D show a power tool system that includes a power tool and a battery pack in accordance with an embodiment of the present invention.
Figure 3B:
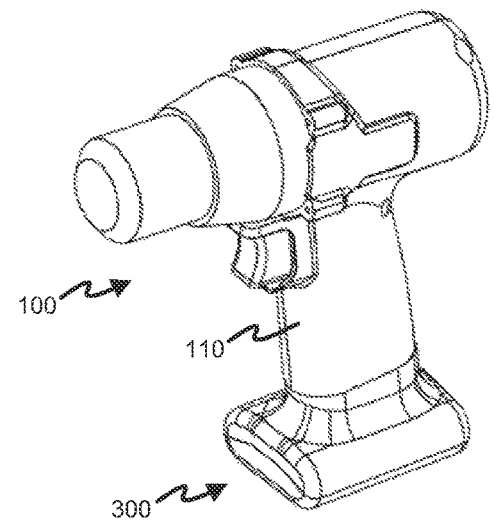
Figure 3C:
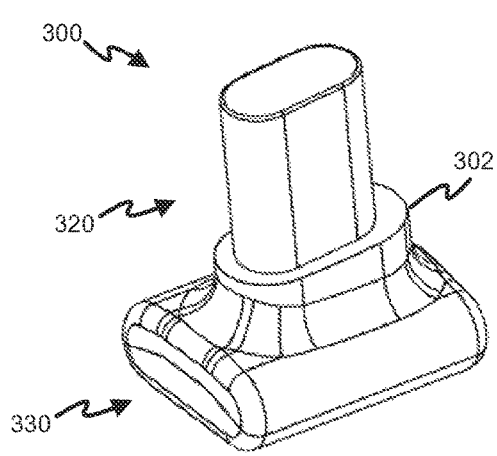
Figure 3D:
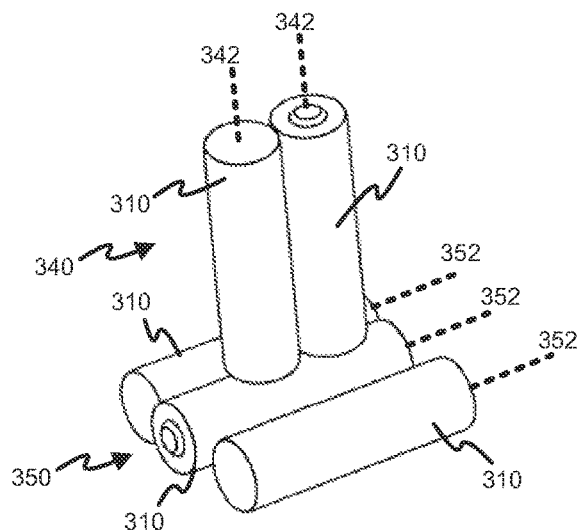

As shown in FIGS. 3C and 3D, the battery pack 300 includes five battery cells 310 in the housing 302. In particular, each battery cell 310 may nominally provide 4 volts and may be coupled in series with one another to realize a battery pack 300 that provides a nominal voltage of 20 volts. The battery cells 310 may be any rechargeable battery cell chemistry type, such as, for example, nickel cadmium (NiCd), nickel-metal hydride (NiMH), Lithium (Li), Lithium-ion (Li-ion), other Lithium-based chemistry, other rechargeable battery cell chemistry, etc. However, in one preferred embodiment, each of the battery cells 310 is a lithium-ion battery cell.

As shown, each battery cell 310 may have generally cylindrical shape and may extend along a cell axis 342, 352 that is parallel to an outer, cylindrical cell wall of each cell 310. Moreover, each battery cell 310 may have a diameter of about eighteen millimeters (18 mm) and a length in the range of about sixty millimeters (60 mm) to about seventy millimeters (70 mm), with nominal lengths of 60 mm, 65 mm, and 70 mm preferred in some embodiments.

As shown, the battery cells 310 are arranged in a first group 340 of two battery cells and a second group 350 of three battery cells. In the first group 340, the cell axes 342 are parallel to one another. In the second group 350, the cell axes 352 are parallel to each other. However, the first group 340 and the second group 350 are arranged so that the cell axes 342 of the first group 340 are not parallel to the cell axes 352 of the second group 350. As shown in FIG. 3D, the cell axes 342 of the first group 340 may be perpendicular or nearly perpendicular (e.g., 90°±5°) to the cell axes 352 of the second group 352. However, in other embodiments, the cell axes 342 of the first group 340 may form a more acute angle (e.g., between about 90° and about 70°, or between about 90° and about 45°) with the cell axes 352 of the second group 350.

Moreover, the first group 340 of cells 310 are positioned to correspond to the post portion 320 of the battery pack housing 302 and the second group 350 of cells 310 are positioned to correspond to the base portion 330 of the battery pack housing 302. As a result of such configuration, the first group 340 of cells 310 are generally received by the handle 110 of the power tool 100 when the battery pack 300 is attached to the power tool 100. Conversely, the second group 350 of cells 310 are generally not received by the handle 110 of the power tool 100 when the battery pack 300 is attached to the power tool.

In some embodiments, the first group 340 of cells 310 are completely received by the power tool 100 or handle 110 such that 100% of the volume of each cell 310 in the first group 340 is contained within the power tool 100 or handle 110. In other embodiments, the first group 340 is substantially received by the handle 110 such that greater than 80% of the volume of each cell 310 is contained within the power tool 100 or handle 110 and less the 20% of the volume of each cell 310 extends beyond the power tool 100 or handle 110. In yet other embodiments, the first group 340 is mostly received by the power tool 100 or handle 110 such that greater than 50% of the volume of each cell 310 is contained within the power tool 100 or handle 110 and less the 50% of the volume of each cell 310 extends beyond the power tool 100 or handle 110.

By arranging the battery cells 310 in the battery pack 300 such that one or more cells 310 extend into the power tool 100 or handle 110 when attached, the battery pack 300 reduces the overall size or footprint of the power tool 100 when in use. More specifically, a battery pack such as battery pack 300 reduces the usable footprint of the power tool 100 when compared to a battery pack in which none of the cells are contained, substantially contained, or mostly contained by the power tool 100 or handle 110 when the battery pack is attached to the power tool 100.

Referring now to FIGS. 4A-4D, further details of the battery pack 400 with respect to power tool 100 will be explained. As shown, the battery pack 400 includes an outer housing 402 or casing having a post portion 420 and a base portion 430. Similar to the post portion 220 of battery pack 200, the post portion 420 may be inserted and slid into a proximal end of a power tool cavity toward a distal end of the cavity until the battery pack 400 is properly seated and attached to power tool 100.

The post portion 420 may include electrical contacts (not shown) that are configured to electrically couple to electrical contacts of the power tool 100 when the post portion 420 is inserted and seated in the handle 110 of the power tool 100. In particular, electrical contacts of the power tool 100 and battery pack 400 may electrically couple rechargeable, battery cells 410 of the battery pack 400 to the power tool 100 so as to provide electrical power to electrical components of the power tool 100.

Figure 4A:
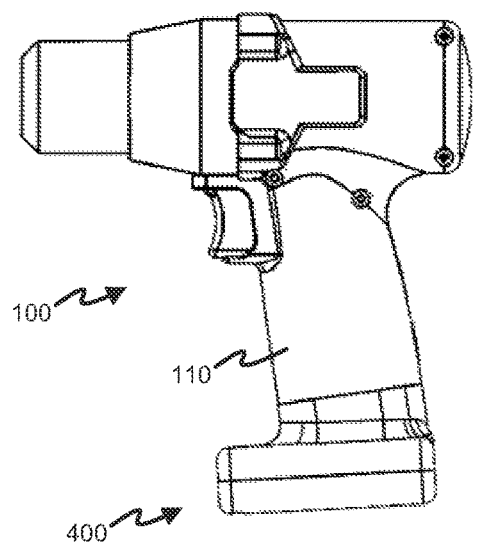
FIGS. 4A-4D show a power tool system that includes a power tool and a battery pack in accordance with an embodiment of the present invention.
Figure 4B:
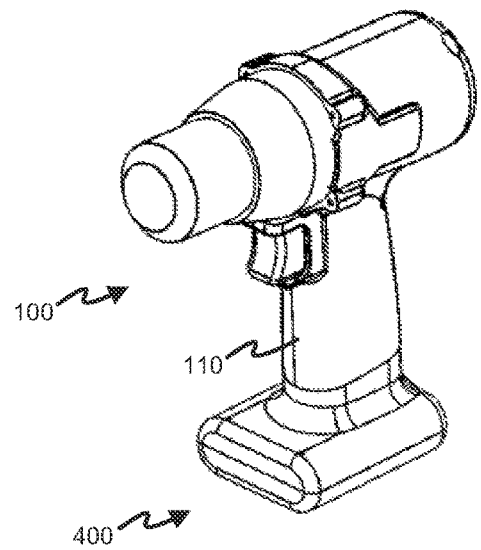
Figure 4C:
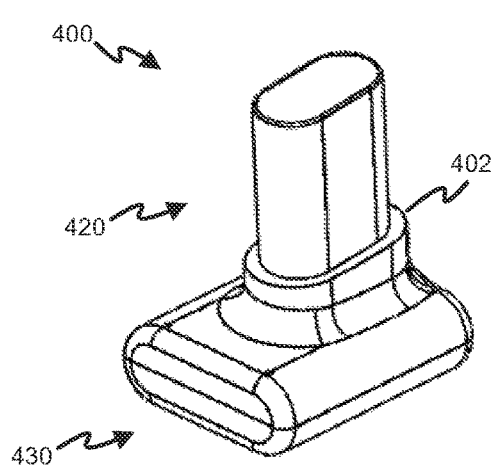
Figure 4D:
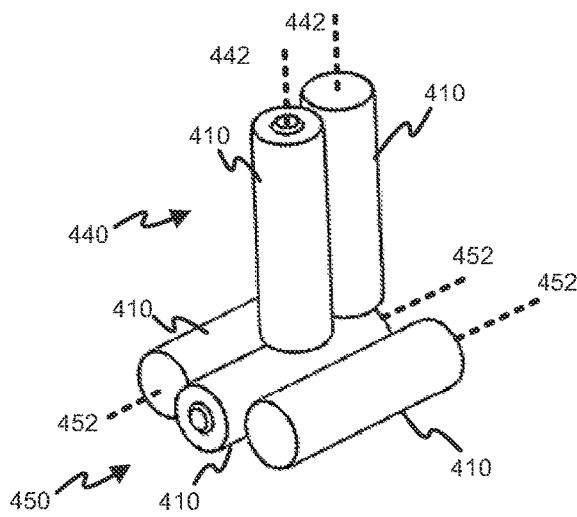
Figure 5A:
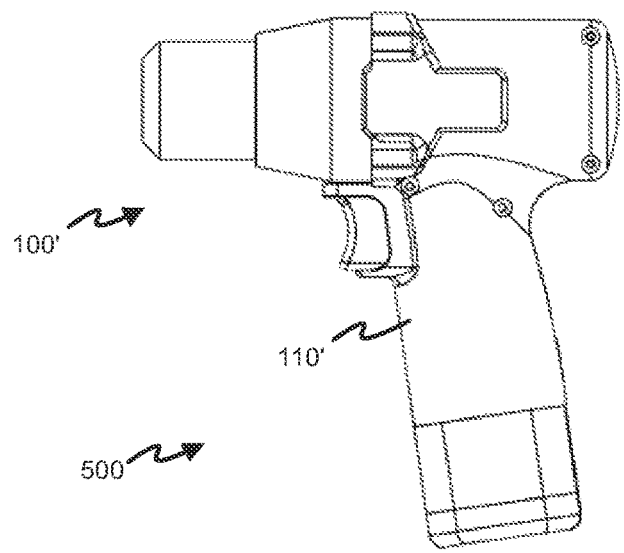
FIGS. 5A-5D show a power tool system that includes a power tool and a battery pack in accordance with an embodiment of the present invention.
Figure 5B:
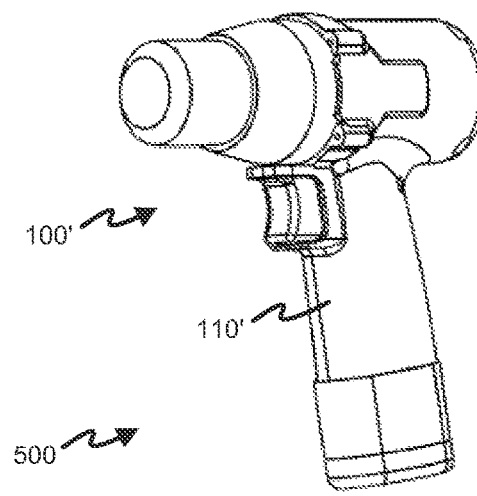
Figure 5C:
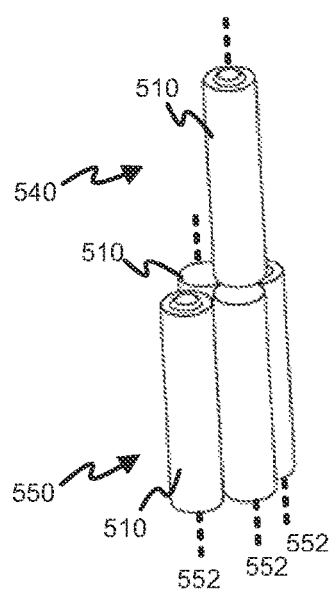
Figure 5D:
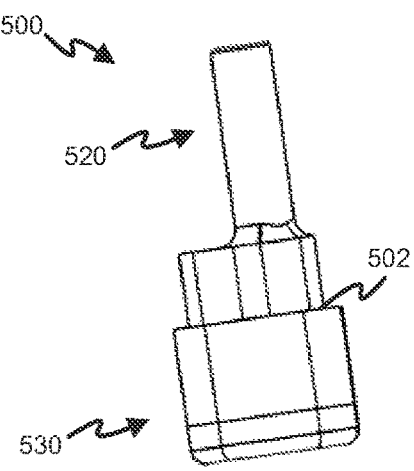
Figure 6A:
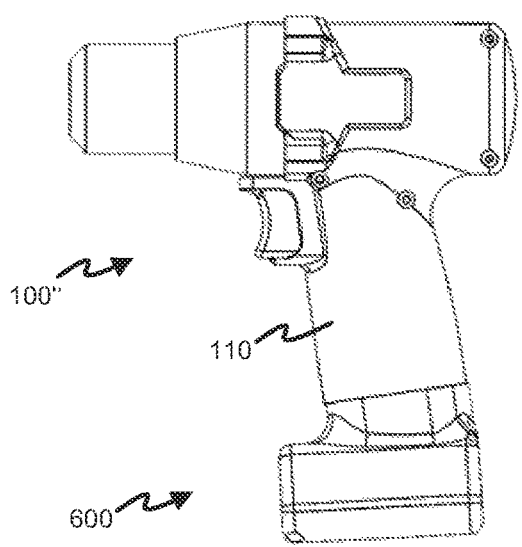
FIGS. 6A-6D show a power tool system that includes a power tool and a battery back in accordance with an embodiment of the present invention.
Figure 6B:
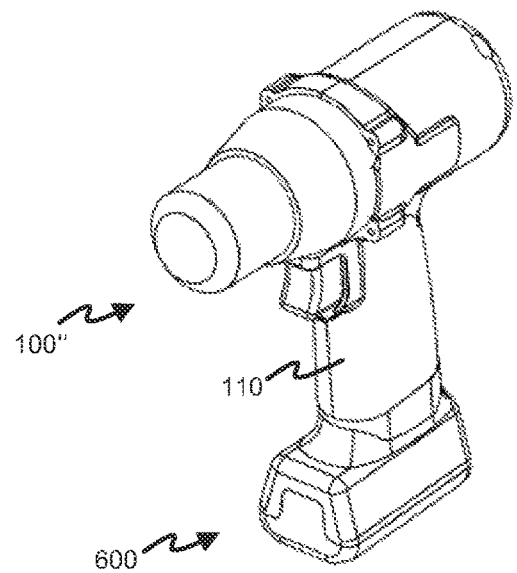
Figure 6C:
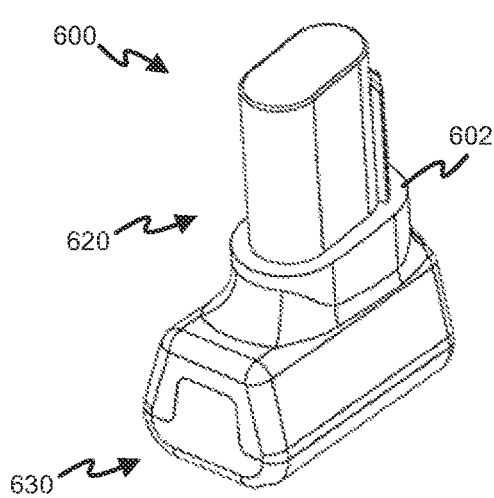
Figure 6D:
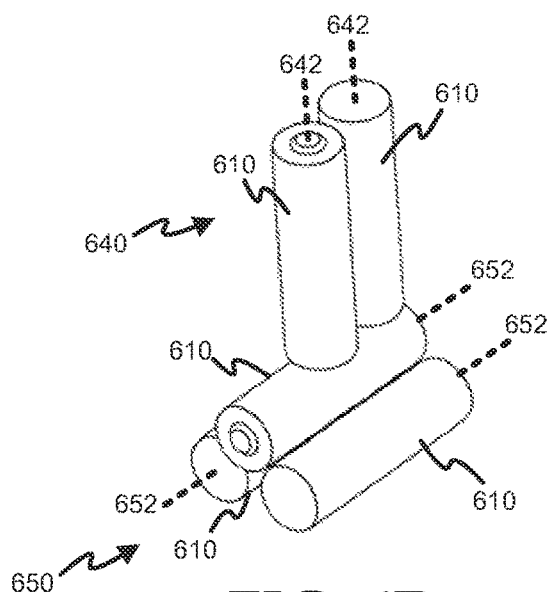
Figure 7A:
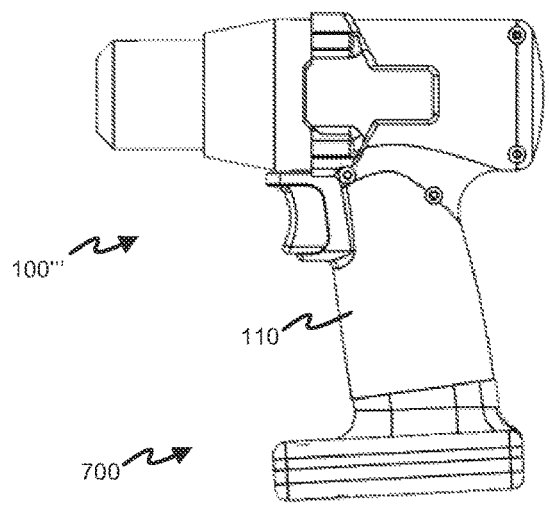
FIGS. 7A-7D show a power tool system that includes a power tool and a battery pack in accordance with an embodiment of the present invention.
Figure 7B:
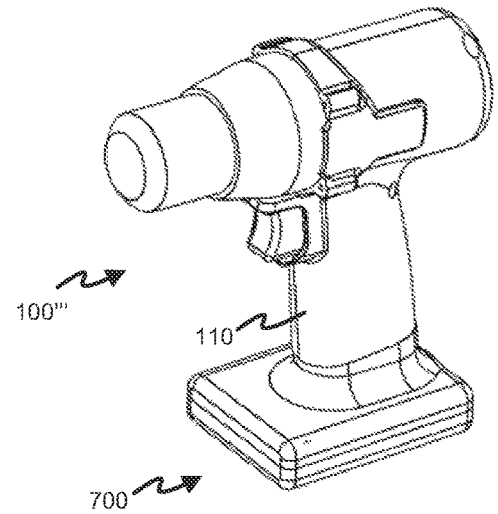
Figure 7C:
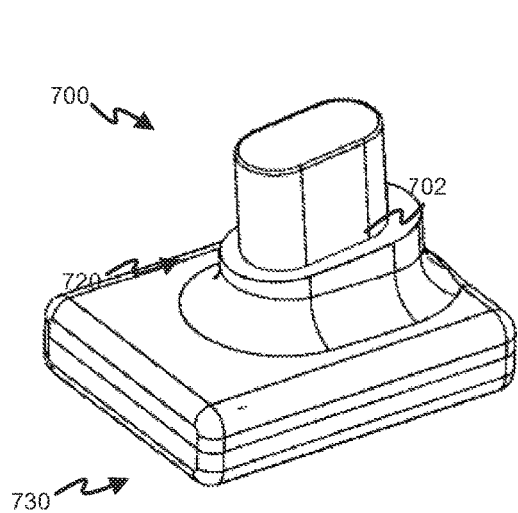
Figure 7D:
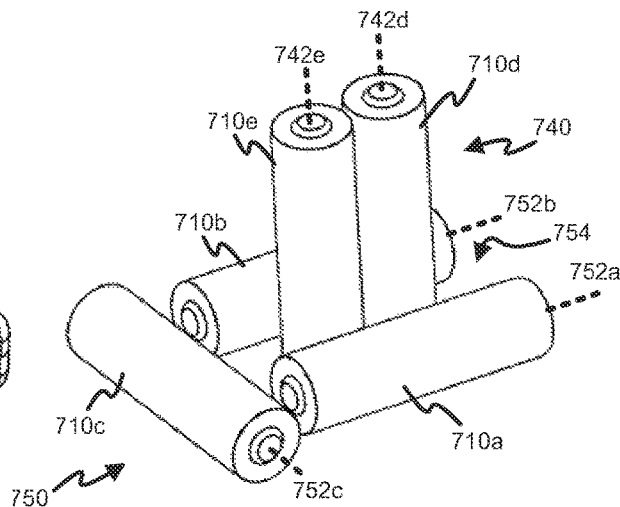
Figure 8A:
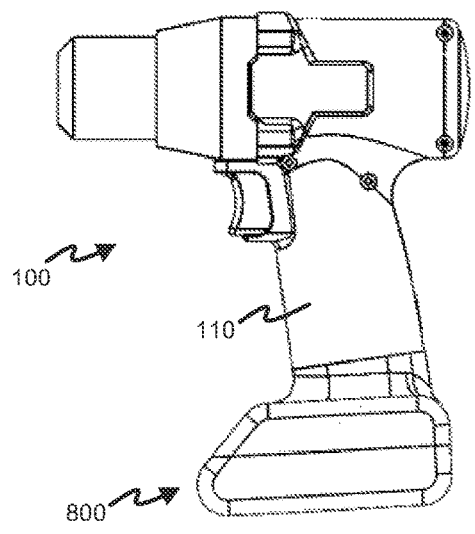
FIGS. 8A-8D show a power tool system that includes a power tool and a battery pack in accordance with an embodiment of the present invention.
Figure 8B:
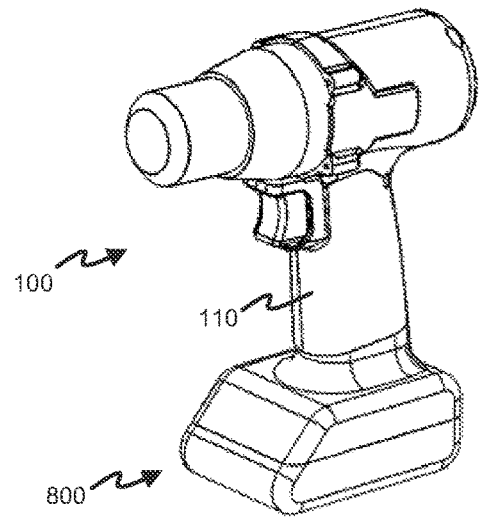
Figure 8C:
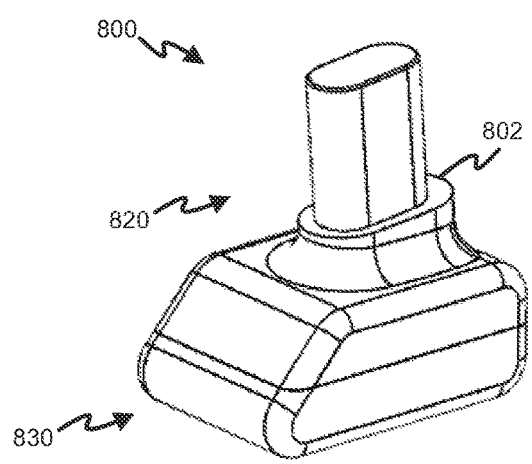
Figure 8D:
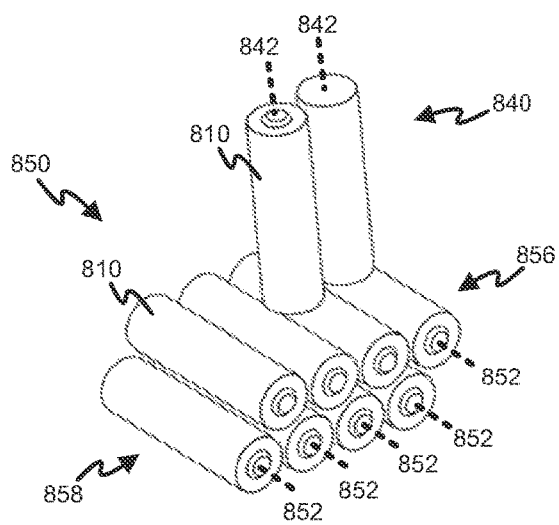

As shown in FIGS. 4C and 4D, the battery pack 400 includes five battery cells 410 in the housing 402. In particular, each battery cell 410 may nominally provide 4 volts and may be coupled in series with one another to realize a battery pack 400 that provides a nominal voltage of 20 volts. The battery cells 410 may be any rechargeable battery cell chemistry type, such as, for example, nickel cadmium (NiCd), nickel-metal hydride (NiMH), Lithium (Li), Lithium-ion (Li-ion), other Lithium-based chemistry, other rechargeable battery cell chemistry, etc. However, in one preferred embodiment, each of the battery cells 410 is a lithium-ion battery cell.

As shown, each battery cell 410 may have generally cylindrical shape and may extend along a cell axis 442, 452 that is parallel to an outer, cylindrical cell wall of each cell 410. Moreover, each battery cell 410 may have a diameter of about twenty millimeters (20 mm) and a length in the range of about sixty millimeters (60 mm) to about seventy millimeters (70 mm), with nominal lengths of 60 mm, 65 mm, and 70 mm preferred in some embodiments.

As shown, the battery cells 410 are arranged in a first group 440 of two battery cells and a second group 450 of three battery cells. In the first group 440, the cell axes 442 are parallel to one another. In the second group 450, the cell axes 452 are parallel to each other. However, the first group 440 and the second group 450 are arranged so that the cell axes 442 of the first group 440 are not parallel to the cell axes 452 of the second group 450. As shown in FIG. 4D, the cell axes 442 of the first group 440 may be perpendicular or nearly perpendicular (e.g., 90°±5°) to the cell axes 452 of the second group 452. However, in other embodiments, the cell axes 442 of the first group 440 may form a more acute angle (e.g., between about 90° and about 70°, or between about 90° and about 45°) with the cell axes 452 of the second group 450.

Moreover, the first group 440 of cells 410 are positioned to correspond to the post portion 420 of the battery pack housing 402 and the second group 450 of cells 410 are positioned to correspond to the base portion 430 of the battery pack housing 402. As a result of such configuration, the first group 440 of cells 410 are generally received by the handle 110 of the power tool 100 when the battery pack 400 is attached to the power tool 100. Conversely, the second group 450 of cells 410 are generally not received by the handle 110 of the power tool 100 when the battery pack 400 is attached to the power tool.

In some embodiments, the first group 440 of cells 410 are completely received by the power tool 100 or handle 110 such that 100% of the volume of each cell 210 in the first group 240 is contained within the power tool 100 or handle 110. In other embodiments, the first group 440 is substantially received by the handle 110 such that greater than 80% of the volume of each cell 410 is contained within the power tool 100 or handle 110 and less the 20% of the volume of each cell 410 extends beyond the power tool 100 or handle 110. In yet other embodiments, the first group 440 is mostly received by the power tool 100 or handle 110 such that greater than 50% of the volume of each cell 410 is contained within the power tool 100 or handle 110 and less the 50% of the volume of each cell 410 extends beyond the power tool 100 or handle 110.

By arranging the battery cells 410 in the battery pack 400 such that one or more cells 410 extend into the power tool 100 or handle 110 when attached, the battery pack 400 reduces the overall size or footprint of the power tool 100 when in use. More specifically, a battery pack such as battery pack 400 reduces the usable footprint of the power tool 100 when compared to a battery pack in which none of the cells are contained, substantially contained, or mostly contained by the power tool 100 or handle 110 when the battery pack is attached to the power tool 100.

Referring now to FIGS. 5A-5D, further details of another power tool system comprising a power tool 100' and a battery pack 500. The power tool system is similar to the power tool system of FIGS. 2A-2D, 3A-3D, and 4A-4D. However, the battery cells 510 of battery pack 500 are stacked in a longitudinal manner. Namely, the battery pack 500 like battery packs 200, 300, 400 includes a first group 540 of battery cells and a second group 550 of battery cells. However, the first group 540 is shown having a single battery cell 510 and the second group 550 is shown as having four battery cells 510. Moreover, the cells 510 of the first group 540 are stacked longitudinally upon the cells 510 of the second group 550 such that the cell axes 542, 552 of each group 540, 550 are parallel or nominally parallel (e.g., ±5°) to one another.

Moreover, the first group 540 of cells 510 are positioned to correspond to a post portion 520 of the battery pack housing 502 and the second group 550 of cells 410 are positioned to primarily correspond to the base portion 530 of the battery pack housing 502. However, as depicted, the second group 550 of cells 510 may significantly extend into the post portion 520 as well. As a result of such an arrangement, the first group 540 of cells 510 are generally received by the handle 110 of the power tool 100 when the battery pack 400 is attached to the power tool 100. Moreover, at least a significant portion of the second group 450 of cells 410 are also received by the handle 110 of the power tool 100 when the battery pack 400 is attached to the power tool.

In some embodiments, the first group 540 of cells 510 is completely received by the power tool 100 or handle 110 such that 100% of the volume of each cell 510 in the first group 540 is contained within the power tool 100 or handle 110. Moreover, the second group 540 is significantly received by the handle 110 such that greater than 20% of the volume of each cell 510 is contained within the power tool 100 or handle 110. In yet other embodiments, the second group 550 is mostly received by the power tool 100 or handle 110 such that greater than 50% of the volume of each cell 510 is contained within the power tool 100 or handle 110 and less the 50% of the volume of each cell 510 of the second group 550 extends beyond the power tool 100 or handle 110.

Referring now to FIGS. 6A-6D, further details of another power tool system comprising a power tool 100″ and a battery pack 600. The power tool system is similar to the power tool system of FIGS. 2A-2D, 3A-3D, and 4A-4D. However, the battery cells 610 in the base portion 630 are stacked like logs. Namely, the battery pack 600 like battery packs 200, 300, 400 includes a first group 640 of battery cells and a second group 650 of battery cells. However, the cells 610 of the second group 650 are stacked such that the cylindrical walls of at least one of the battery cells 610 rests upon the cylindrical walls or is positioned above the cylindrical walls of another battery cell 610 of the second group 650.

The first group 640 of cells 510 are positioned to correspond to a post portion 620 of the battery pack housing 602 and the second group 650 of cells 610 are positioned to primarily correspond to the base portion 630 of the battery pack housing 602. Similar to battery packs 200, 300, and 400, the first group 640 of cells 410 may be completely received, may be substantially received, or may be mostly received by the power tool 100 or handle 110 such that 100%, greater than 80%, or greater than 50% of the volume of each cell 610 in the first group 640 is contained within the power tool 100 or handle 110.

Referring now to FIGS. 7A-7D, further details of another power tool system comprising a power tool 100′″ and a battery pack 700. The power tool system is similar to the power tool system of FIGS. 2A-2D, 3A-3D, and 4A-4D. However, the battery cells 710 in the base portion 730 are spread apart to permit battery cells in the post portion 720 to extend into the base portion 730. Namely, the battery pack 700 like battery packs 200, 300, 400 includes a first group 740 of battery cells and a second group 750 of battery cells. However, two of the cells 710a, 710b from the second group 750 are laterally separated from each other such that a gap 754 is formed between the cylindrical walls of the two cells 710a, 710b while the cell axes 752a, 752b of the two cells 710a, 710b remain parallel to each other. Furthermore, the third cell 710c is positioned such that the cell axis 752c of the third cell 710c is perpendicular to, but lies in the same plane as the cell axes 752a, 752b of the two cells 710a, 710b. Such an arrangement, permits distal end of the cells 710d, 710e of the first group 740 to extend into the gap 754 between the cells 710a, 710b, thus reducing the overall height of the battery pack 700. Moreover, such an arrangement results in the cell axes 742d, 742e being perpendicular or nearly perpendicular with the cell axes 752a, 752b, 752c. In some embodiments, the cell axes 742d, 742e may form a more acute angle with the cell axes 752a, 752b, 752c.

Referring now to FIGS. 8A-8D, further details of another 20 V battery pack 800 for use with the power tool system of FIGS. 2A-2D, 3A-3D, and 4A-4D. Unlike the packs 200, 300, 400, the battery pack 800 includes ten battery cells 810 instead five battery cells. In particular, the first group 840 associated with the post portion 820 of the housing 802 includes two battery cells 810, but the second group 850 associated with the base portion 830 of the housing includes eight battery cells 810. The cell axes 842 of the first group 840 are perpendicular or nearly perpendicular to the cell axes 852 of the second group 850. However, the cells 810 of the second group 850 are arranged such that a first layer 856 of four cells 810 are stacked such that their cylindrical walls are in close proximity (e.g., about 0.030 inches apart) to the cylindrical walls of a second layer 858 of cells 810. Moreover, the cell axes 852 are rotated with respect to the cell axes of packs 200, 300, 400 such that the cell axes 852 align with a line extending from a left and right side of the power tool 100 instead of aligning with a line extending from a front and back side of the power tool 100.

FIGS. 8A-8D depict the battery pack 800 with ten battery cells 810. However, a similar technique may be utilized to extend the battery pack 800 to other multiples of five such as fifteen battery cells. For example, a third layer of five battery cells 810 could be arranged under second layer 858.

FIGS. 9A-9D show that the battery packs 200, 300, 400, 500, 600, 700, 800 may be implemented such that the packs may be inserted into the power tool 100 in at least two orientations. However, embodiments that permit insertion of the battery packs in a greater number of orientations are envisioned and contemplated.

Figure 9A:
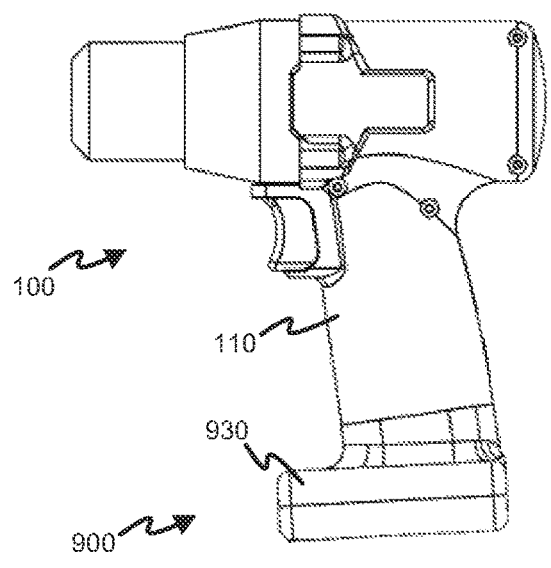
FIGS. 9A-9D show a power tool system that includes a power tool and a battery pack in accordance with an embodiment of the present invention.
Figure 9B:
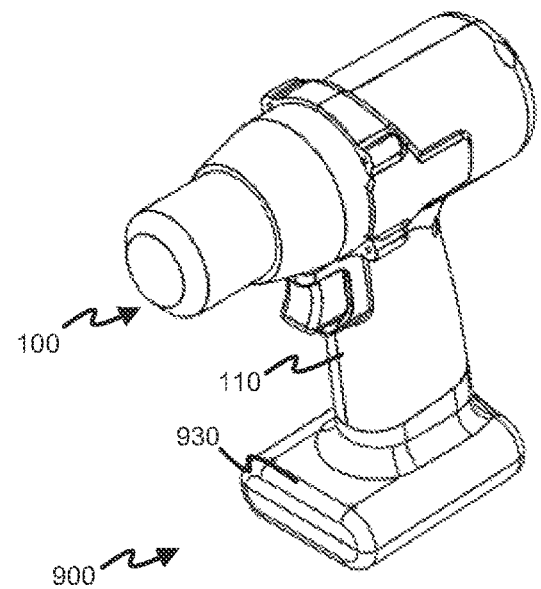
Figure 9C:
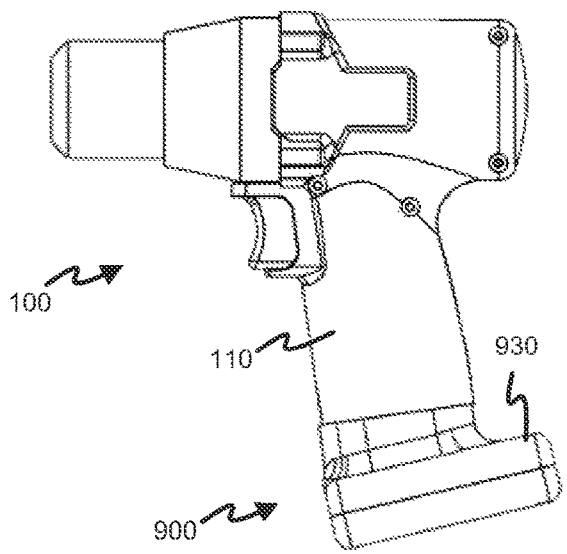
Figure 9D:
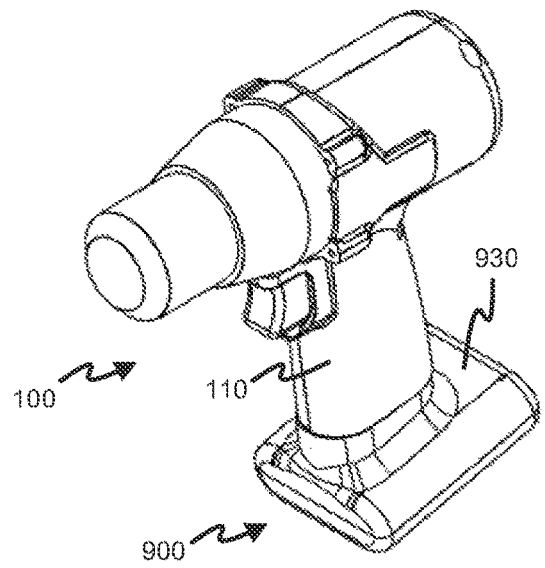
Figure 10A:
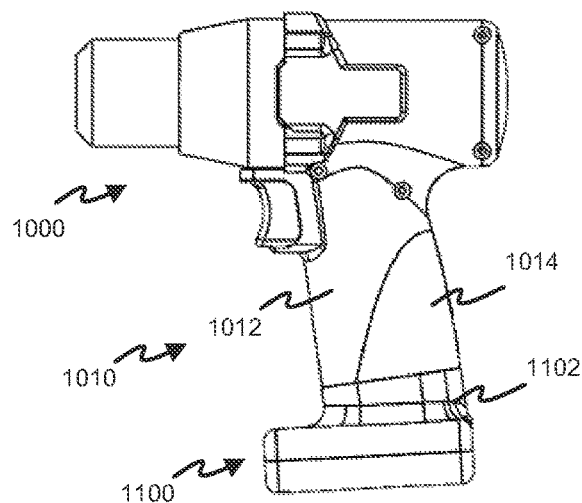
FIGS. 10A-10D show a power tool system that includes a power tool and a battery pack in accordance with an embodiment of the present invention.
Figure 10B:
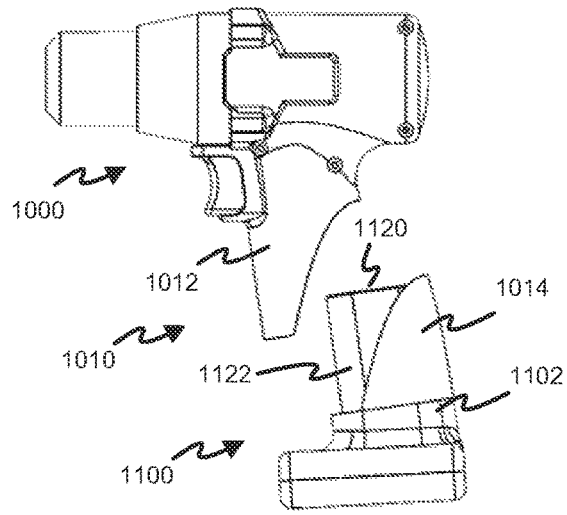
Figure 10C:
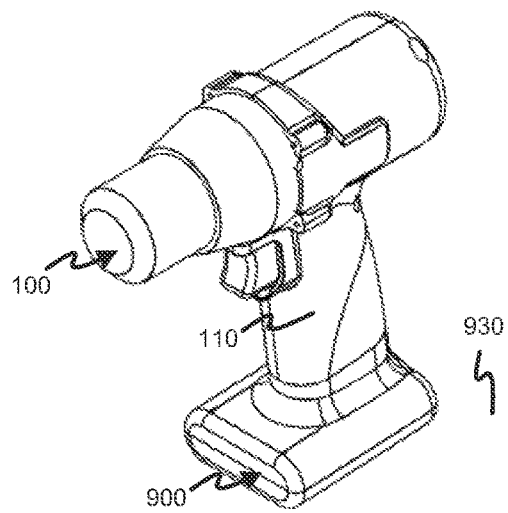
Figure 10D:
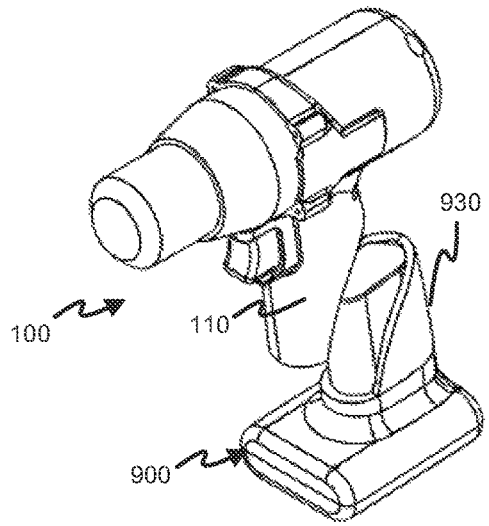
Figure 11A:
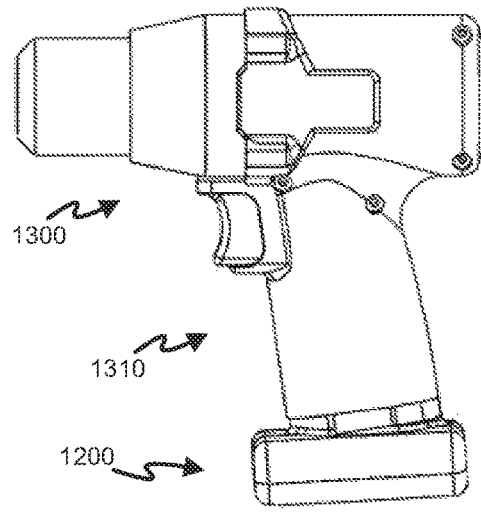
Figure 11B:
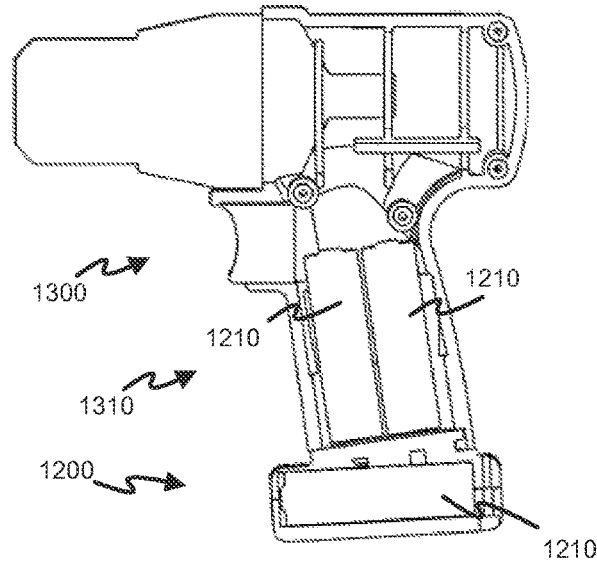
Figure 11C:
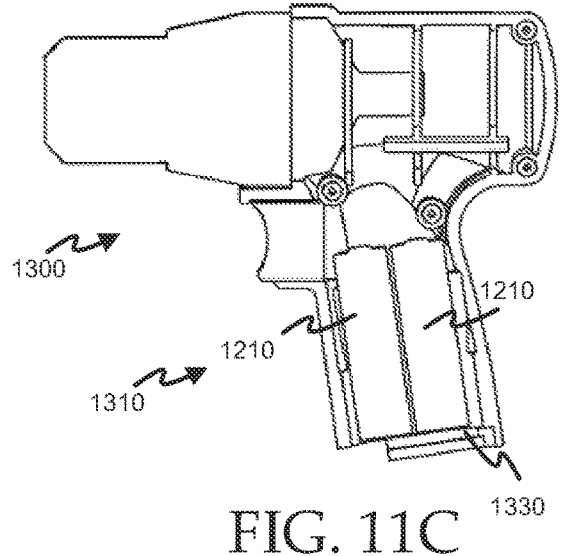
Figure 11D:
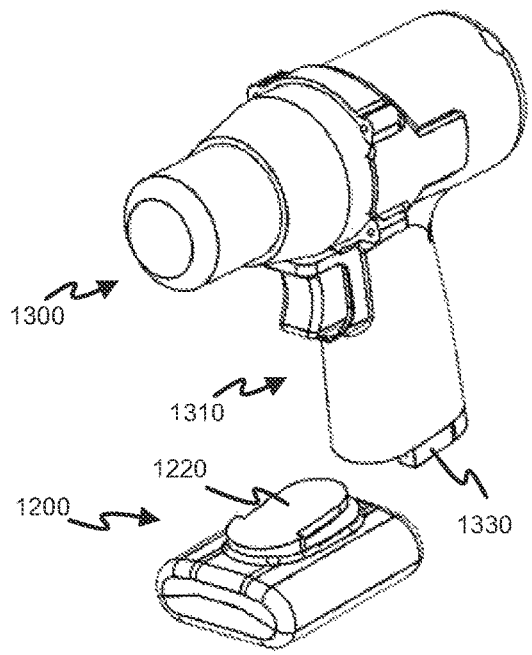

As shown in FIGS. 9A and 9B, the base or boot portion 930 of a battery pack 900 may extend further to a front of the power tool 100 than toward a back of the power tool 100. As such, the battery pack 900 in the orientation of FIGS. 9A and 9B presents more weight toward the front of the power tool 100 than the back of the power tool 100. As shown in FIGS. 9C and 9D, the battery pack 900 inserted into the power tool 100 such that the pack 900 extends further toward the back of the power tool 100 than the front of the power tool 100. Such an orientation may better balance the power tool 100 along the handle 110 making the power tool 100 easier to use. Furthermore, such rotation adjusts the foot print or silhouette of the power tool 100 during use. When used in tight quarters, reorienting the battery pack 900 may provide additional clearance enabling the use of the power tool 900 in a small area that may not otherwise be accessible or may be more difficult to access if the battery pack 900 were not reoriented.

Referring now to FIGS. 10A-10D, another embodiment of a power tool system is shown in which a first portion 1012 of the handle 1010 for the power tool 1000 is provided by the power tool 1000 and a second portion 1014 of the handle 1010 is provided by the battery pack 1100. The battery pack 1100 may be implemented in a manner similar to the previously discussed battery packs. However, the housing 1102 of the battery pack 1100 may incorporate the second portion 1014 of the handle 1010 into the post portion 1120 of the battery pack 1100. The battery pack 1100 may enable the power tool 1000 to have a smaller handle 1010 since the handle 1010 no longer needs to provide clearance for receiving the post portion 1120 of the battery pack 1100. For example, in the embodiment of FIGS. 10A-10D, the handle 1010 may provide clearance for the receipt of a front surface 1122 of the post portion. However, since the second portion 1014 is incorporated into the post portion 1122, the post portion 1120 does not have a corresponding rear surface to be received, thus permitting the handle 1010 to be smaller than otherwise would be permitted.

Referring now to FIGS. 11A-11E, another embodiment of a power tool system is shown in which two battery cells 1210 are incorporated into the handle 1310 of the 20 V power tool 1300. As a result of incorporating two battery cells 1210 into the handle 1310, the handle 1310 does not need to receive a post portion from battery pack. As such, the handle 1310 may be implemented to be smaller than the handles 110 of the above-described power tool 100. As shown, the power tool 1300 may instead user a smaller battery pack 1200 which includes three battery cells 1210 having cell axes 1252 roughly perpendicular to cell axes 1242 of the battery cells 1210 incorporated into the handle 1310. Furthermore, the battery pack 1200 may include a slide portion 1220 which may engage rails 1330 of the power tool 1300.

Figure 12A:
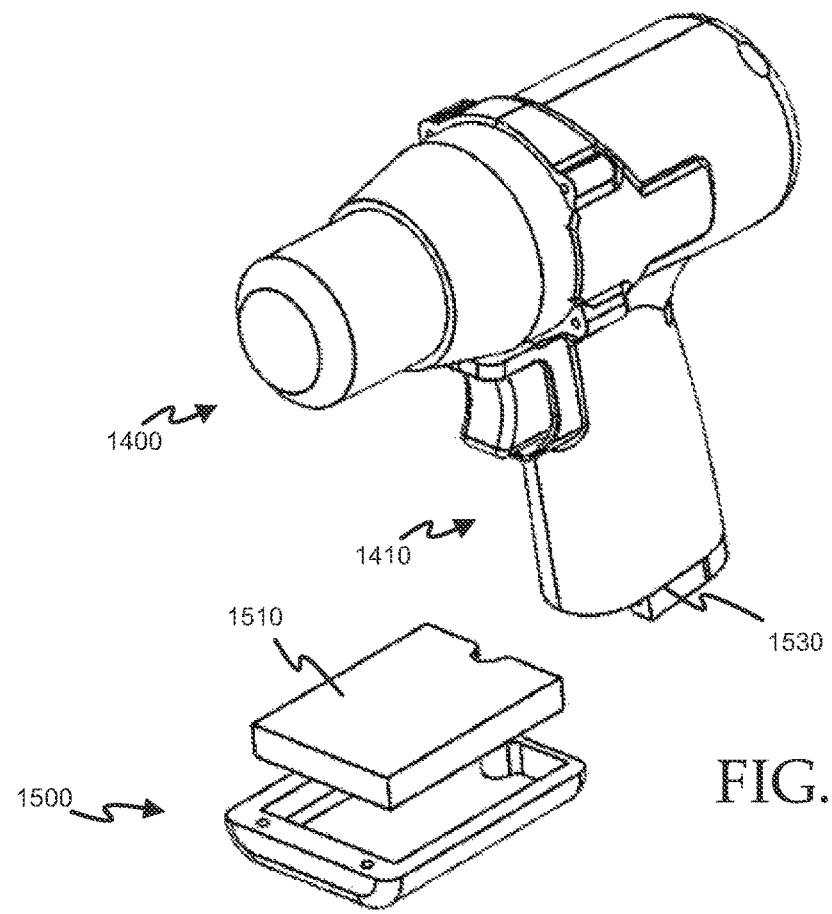
FIGS. 12A-12C show a power tool system that includes a power tool and a battery pack in accordance with an embodiment of the present invention.
Figure 12B:
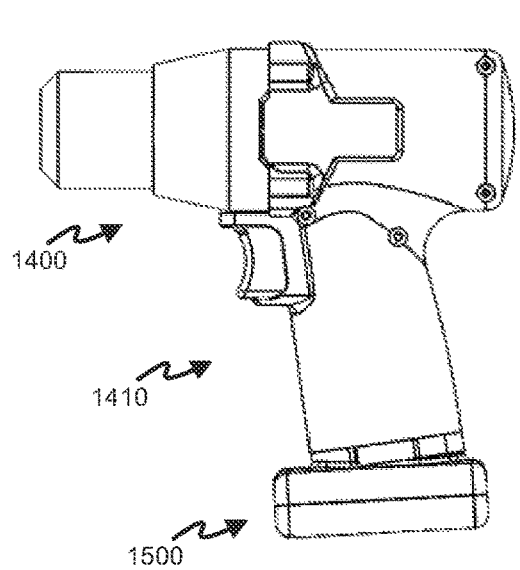
Figure 12C:
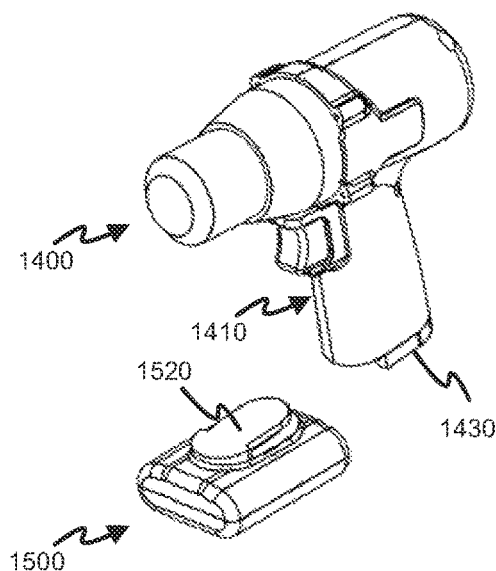

Referring now to FIGS. 12A-12C, yet another embodiment of a power tool system similar to the power tool system of FIGS. 11A-11E is shown. Like the power tool system of FIGS. 11A-11E, the 20 V power tool 1400 of FIGS. 12A-12C may incorporate one or more battery cells (not shown) into its handle 1410. The battery pack 1500 may include a slide portion 1520 similar to the slide portion 1320 of battery pack 1300. However, unlike the battery pack 1200 which utilizes three cylindrical, lithium-ion battery cells 1210, the battery pack 1500 may include one or more lithium polymer battery cells 1510. In another embodiment, the lithium polymer battery cells 1510 may provide twenty volts on their own, thus permitting embodiments without additional battery cells in the handle 1410.

While the above battery packs were described as using battery cells having a single size (e.g., 14 mm, 18 mm, or 20 mm), some battery packs may utilize battery cells of more than one size. Mixing battery cells of different sizes may reduce the volume of consumed by the battery cells of the battery pack and may help provide a denser design. For example, the right side of FIG. 13A illustrates an arrangement of ten battery cells using a single size (e.g., 18 mm lithium-ion cells). The left side of FIG. 13A presents a similar arrangement of ten battery cells but utilizes a mix of cell sizes (e.g., 20 mm and 14 mm lithium-ion cells). The arrangement of ten cells of the left side may be capable of delivering similar performance as the arrangement of ten cells on the right side. However, as depicted, the arrangement of ten cells on the left side has a reduced vertical height in comparison to the ten cells on the right side.

FIG. 13B depicts yet another arrangement of ten cells of mixed sizes (e.g., 20 mm and 14 mm lithium-ion cells). Again, the arrangement of ten cells shown in FIG. 13B may be capable of delivering similar performance as the arrangements shown in FIG. 13A. However, the arrangement of FIG. 13 consumes a smaller volume than either arrangement of FIG. 13A.

In some embodiments, the battery packs may include circuitry to monitor battery characteristics, to provide voltage detection, to store battery characteristics, to display battery characteristics, to inform a user of certain battery characteristics, to suspend current within the battery pack, to detect temperature of the battery pack, battery cells, and the like, to transfer heat from and/or within the battery pack, and to provide balancing methods when an imbalance is detected within one or more battery cells. In some embodiments, such circuitry may include a voltage detection circuit, a boosting circuit, a state of charge indicator, and the like.

In some embodiments, the circuitry may also include processing circuitry such as a microprocessor or microcontroller. The processing circuitry may monitor various battery pack parameters (e.g., battery pack present state of charge, battery cell present state of charge, battery pack temperature, battery cell temperature, and the like), may store various battery pack parameters and characteristics (including battery pack nominal voltage, chemistry, and the like, in addition to the parameters), may control various electrical components, and may communicate with other electrical devices, such as, for example, a power tool, a battery charger, and the like. In some embodiments, the processing circuitry may monitor each battery cell's present state of charge and may identify when an imbalance occurs (e.g., the present state of charge for a battery cell exceeds the average cell state of charge by a certain amount or drops below the average cell state of charge by a certain amount). In some embodiments, the processing circuitry may re-balance the cells when an imbalance has been detected.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A power tool system, comprising:
a power tool comprising an electrical component; and
a battery pack comprising at least one battery cell;
wherein the at least one battery cell of the battery pack is configured to supply electrical power to the electrical component of the power tool when the battery pack is attached to the power tool;
wherein a portion of the battery pack that comprises the at least one battery cell is configured to be inserted into a cavity of the power tool; and
wherein a weight distribution of the power tool and attached battery pack is adjustable via an orientation of the battery pack attached to the power tool.

2. The power tool system of claim 1, wherein the power tool supports attachment of the battery pack in at least two different orientations.

3. The power tool system of claim 1, wherein the power tool comprises a battery compartment configured to:
receive the battery pack in at least two different orientations; and
couple the at least one battery cell of the battery pack to the electrical component of the power tool.

4. The power tool system of claim 1, wherein the battery pack extends further in a first direction when attached to the power tool in a first orientation than when attached to the power tool in a second orientation.

5. The power tool system of claim 1, wherein the battery pack distributes more weight toward a first side of the power tool when attached to the power tool in a first orientation than when attached to the power tool in a second orientation.

6. The power tool system of claim 1, wherein the at least one battery cell comprises battery cells of a same diameter.

7. The power tool system of claim 1, wherein the at least one battery cell comprises:
first battery cells of a first diameter; and
second battery cells of a second diameter that differs from the first diameter.

8. The power tool system of claim 7, wherein longitudinal axes of the first battery cells are parallel to longitudinal axes of the second battery cells.

9. The power tool system of claim 1, wherein:
the at least one battery cell comprises a first layer of first battery cells and a second layer of second battery cells;
each first battery cell has a first diameter; and
each second battery cell has a second diameter that differs from the first diameter.

10. The power tool system of claim 9, wherein a longitudinal axis of one of the first battery cells is aligned with longitudinal interface between adjacent second battery cells.

11. A power tool system, comprising:
a power tool comprising an electrical component; and
a battery pack comprising at least one battery cell;
wherein the at least one battery cell of the battery pack is configured to supply electrical power to the electrical component of the power tool when the battery pack is attached to the power tool;
wherein a portion of the battery pack that comprises the at least one battery cell is configured to be inserted into a cavity of the power tool; and
wherein a footprint of the power tool and attached battery pack is adjustable via an orientation of the battery pack attached to the power tool.

12. The power tool system of claim 11, wherein the power tool supports attachment of the battery pack in at least two different orientations.

13. The power tool system of claim 11, wherein the power tool comprises a battery compartment configured to:
receive the battery pack in at least two different orientations; and
couple the at least one battery cell of the battery pack to the electrical component of the power tool.

14. The power tool system of claim 11, wherein the battery pack extends further in a first direction when attached to the power tool in a first orientation than when attached to the power tool in a second orientation.

15. The power tool system of claim 11, wherein the battery pack distributes more weight toward a first side of the power tool when attached to the power tool in a first orientation than when attached to the power tool in a second orientation.

16. The power tool system of claim 11, wherein the at least one battery cell comprises battery cells of a same diameter.

17. The power tool system of claim 11, wherein the at least one battery cell comprises:
first battery cells of a first diameter; and
second battery cells of a second diameter that differs from the first diameter.

18. The power tool system of claim 17, wherein longitudinal axes of the first battery cells are parallel to longitudinal axes of the second battery cells.

19. The power tool system of claim 11, wherein:
the at least one battery cell comprises a first layer of first battery cells and a second layer of second battery cells;
each first battery cell has a first diameter; and
each second battery cell has a second diameter that differs from the first diameter.

20. The power tool system of claim 19, wherein a longitudinal axis of one of the first battery cells is aligned with longitudinal interface between adjacent second battery cells.

* * * * *